Figure 1:
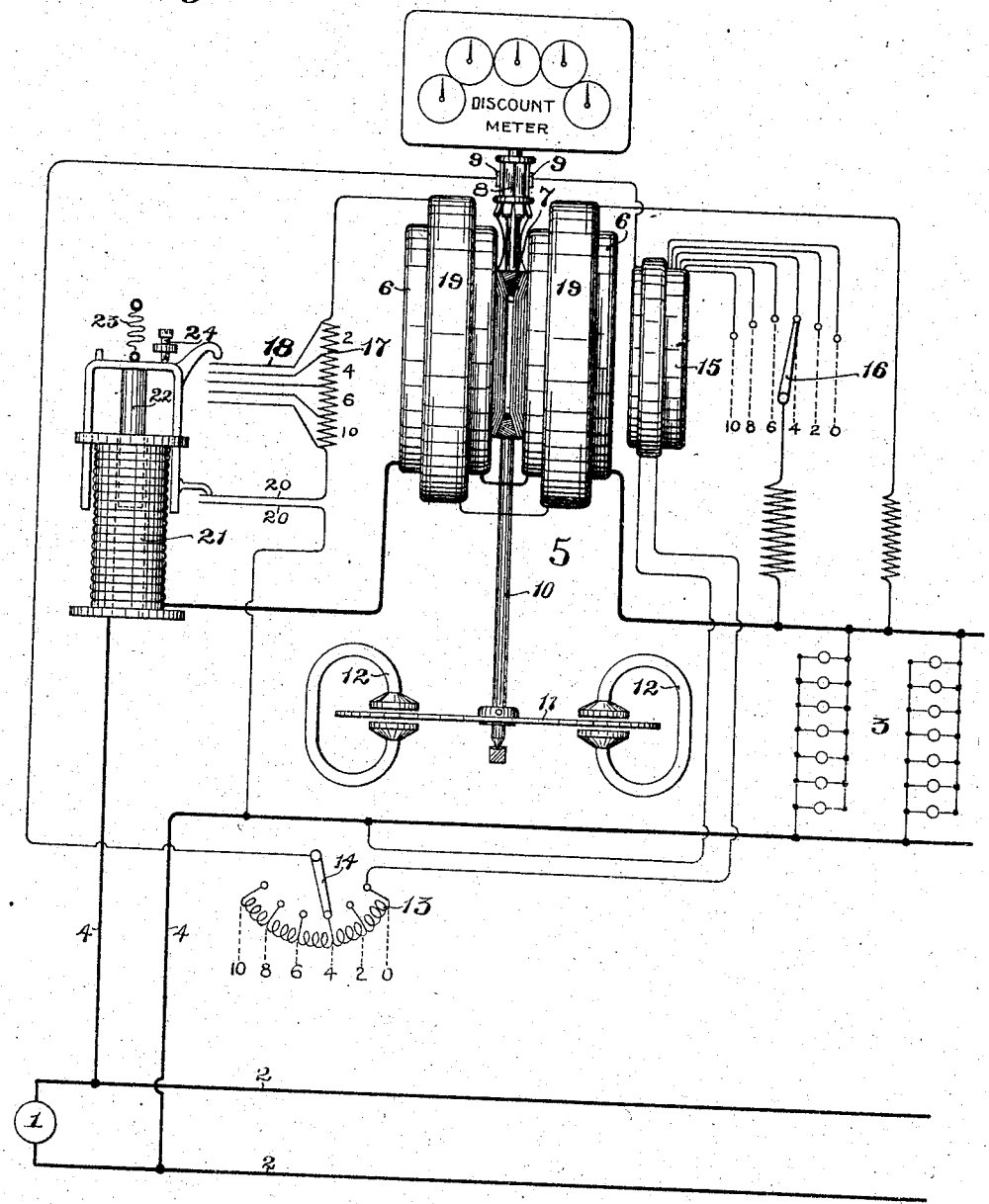

No. 796,039. PATENTED AUG. 1, 1905.
T. DUNCAN.
ELECTRIC METER.
APPLICATION FILED JULY 11, 1901.

2 SHEETS—SHEET 1.

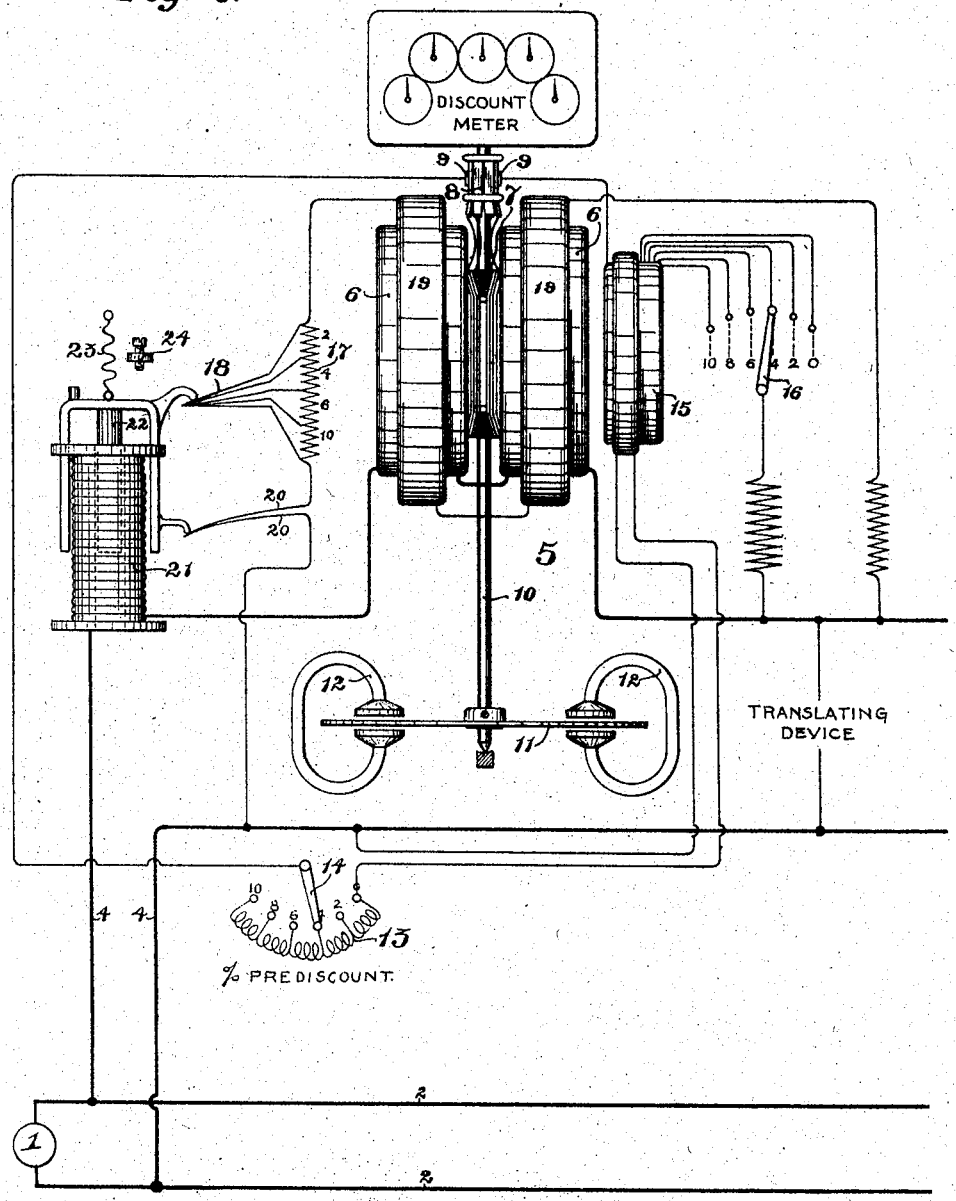

UNITED STATES PATENT OFFICE.

THOMAS DUNCAN, OF CHICAGO, ILLINOIS.

ELECTRIC METER.

No. 796,039. Specification of Letters Patent. Patented Aug. 1, 1905.

Application filed July 11, 1901. Serial No. 67,815.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters for measuring the power in systems of electrical distribution, and has as its most important feature the provision of automatically-operated means for governing the operation of the meter to decrease the rate of operation thereof as the load in the system increases, so that the consumer may have the benefit of a sliding discount, the discount increasing with the increase in current, whereby the rate of operation of the counting-train per unit of load or energy is decreased as the consumption of current increases.

In a copending application, Serial No. 67,814, filed July 11, 1901, I have disclosed an arrangement including a second discount-adjusting resistance in series with a prediscount-adjusting resistance and the armature-winding of a commutated motor-meter. This adjusting resistance was provided with means whereby the amount thereof included in series with the armature might be automatically varied.

In practicing my present invention I include the automatically-varied resistance in circuit with a field-winding, which is preferably a supplemental or auxiliary field-winding that is especially provided for the purpose of furnishing a magnetic field to modify the main torque of the meter. For changing the amount of the fluctuating resistance I preferably provide an electromagnet or solenoid traversed by the main current whose core or armature is adapted, preferably, first, to close the circuit through the auxiliary field-coil upon requisite increase of current in the consumption-circuit and to thereafter permit (the current continuing to increase) engagement between springs constituting the terminals of the various sections of the resistance, whereby these sections are step by step excluded from circuit with the auxiliary field-winding, thereby decreasing the torque of the meter to afford the consumer the sliding discount. As the current in the system exceeds a certain predetermined maximum the core or armature is attracted to permit a connection between a number of the terminal springs corresponding to the excess in the current to exclude a corresponding amount of fluctuating resistance from circuit with the auxiliary field-winding, thereby decreasing the torque of the instrument and causing a reduced rate of operation of the measuring mechanism of the instrument per unit of load or energy.

I will explain my invention more fully by reference to the accompanying drawings, in which—

Figure 1 illustrates a system of direct-current distribution, the meter being diagrammatically indicated in elevation, the fluctuating discount resistance being included in circuit. Fig. 2 is a view similar to Fig. 1, showing all of the fluctuating discount resistance excluded from circuit.

Like parts are indicated by similar characters of reference throughout both figures.

I have illustrated a system of direct-current distribution and commutated motor-meter; but the invention is equally applicable to other systems of electrical distribution and to meters of other forms.

In each of the figures a generator 1 is illustrated, that supplies current to the transmission-mains 2 2. These mains convey current to translating devices, such as electric lamps 3, that may be connected in circuit with supply-conductors 4 4. A meter 5 is associated with the consumer's supply-circuit 4 4, the meter in this instance employing a field-winding divided into coils 6 6 in series with one of the conductors 4 and an armature 7 in bridge between the mains 4 4, a commutator 8, with brushes 9 9, being provided for including the armature in circuit. The armature is mounted upon a shaft 10, at the lower part of which is a damping-disk 11, arranged within the fields of the permanent magnets 12 12 to secure requisite damping effect.

In order to adjust the torque of the meter to conform to the prearranged cost of the current, I preferably include a resistance 13, that may be termed a "prediscount" resistance in series with the armature, this resistance being provided with a plurality of discount-buttons that may be suitably marked to indicate various discounts. A switch-arm 14 may be swung into engagement with any of the buttons to include more or less of the resistance 13 in circuit with the armature. If the consumer is to be charged at the highest rate, the circuit conditions may be such that none of the resistance 13 should be included in circuit with the armature, whereby the greatest torque may exist between the armature and field. If the consumer is to receive four per cent. discount, a certain section of the resistance may be included in circuit by swinging the rheostat-arm 14 to the button marked "4." If the consumer is to receive ten per cent. discount, the arm 14 may be swung to the button "10." Thus the torque of the meter may be readily adjusted to cause the meter to indicate a quantity of energy for which a fixed rate may be charged, the indicated quantity of energy being the same as the actual quantity consumed where no fixed discount is allowed and less than the actual energy consumed, according to the percentage of discount.

Where a supplemental starting field-winding, such as the winding 15, is included in series with the discount resistance, it is obvious that an increase of the prediscount resistance would reduce the volume of current flowing through the auxiliary field-winding, whereby the field produced by the auxiliary winding is reduced in effect, impairing the efficiency thereof, especially when the meter is to work on light loads. To obviate this difficulty, I provide supplemental turns for the supplemental starting field-winding, which are added to the supplemental field-winding as the prediscount resistance is added, whereby a compensation is effected for a reduction in the volume of current, so that a uniform magnetic field, due to the auxiliary winding, is maintained.

A switch-arm 16 may be provided to engage with buttons that are marked to indicate the various discounts in a manner corresponding to the marking of the prediscount resistance. For example, if the consumer is to be allowed no discount no resistance 13 is preferably included in circuit, while the switch-arm 16 is thrown to the button that indicates no discount, whereby a minimum quantity of the auxiliary field-winding is included in the circuit. If the consumer is to be allowed four per cent. discount, the switch-arms 14 and 16 are thrown to the corresponding buttons, whereby some of the resistance 13 is included in series with the armature; but at the same time a corresponding increase is effected in the auxiliary winding 15 to compensate for the reduced current flowing through this winding. The prediscount arrangement forms the subject-matter of my copending application, Serial No. 67,814, filed July 11, 1901.

To provide a fluctuating discount that may or may not be given in addition to the discount afforded by the resistance 13, I provide means, preferably in the form of a torque-adjusting resistance 17, having terminal contact-springs 18. This resistance is preferably included in series with an auxiliary meter-winding, preferably in the form of a subdivided field-winding 19, in which case when the current in the system is within the predetermined limits none of the resistance is short-circuited, as illustrated in Fig. 1. When the current in the system sufficiently increases, the contact-strips 20 20 are closed together to include the auxiliary winding 19 in circuit. The current through the coils 19 19 flows in an opposite direction to the series current through the coils 6 6, so that when the contact-springs 20 20 are brought together the torque is reduced as a result of this opposition of current, and represents a certain discount, depending upon the position of the core 22 or the amount of the resistance 17 excluded. As the current in the consumption-circuit increases the contact-terminal springs 18 are gradually brought together by means to be hereinafter set forth, thereby excluding the resistance 17 step by step from circuit with the auxiliary winding 19, whereby the measuring mechanism is caused to operate at its slowest speed per unit of energy or load. When the increased current fluctuates, more or less of the resistance-terminals 18 are electrically connected to include more or less of the resistance 17, and thereby effect an adjustment of the torque to produce a rate of speed of the measuring mechanism per unit of energy or load in proportion to the current in the system with the discount taken into consideration. The control of the resistance-terminals 18 is automatically effected, preferably by means of an electromagnet or solenoid 21, whose armature or core 22 is provided with a spring 23, that holds the armature against the back-stop 24 during the time that the current in the system is within the limits that do not entitle the consumer to any sliding discount. This adjustment is illustrated in Fig. 1, where the circuit through the auxiliary coil is open, as none of the springs 18 are thrust together by the armature 22 or an extension thereof. The winding of the magnet is preferably included in series with one of the main conductors 4. When there is that current in the system for which the consumer is entitled to the greatest sliding discount, the solenoid-core is fully attracted by its helix, as illustrated in Fig. 2, the armature then being drawn into engagement with the resistance-terminals 18, which are thereupon connected and include no resistance in circuit with the winding 19 to produce the slowest rate of operation of the measuring mechanism per unit of load or energy.

I have illustrated the resistance 17 as being designed to effect a sliding rate of discount of two, four, six, and ten per cent. When there is a sufficient increase in the current to provide for a two-per-cent. discount, the two upper terminal springs 18 are bunched together, there remaining sufficient resistance 17 in circuit to produce a reading discounted two per cent. If the current increases sufficiently further to a quantity where the consumer is entitled to four per cent. discount, a third spring 18 will be bunched with the other two, thereby excluding the two upper sections of the resistance 17 from the circuit and leaving sufficient resistance in circuit to provide for the discount desired. When upon a sufficient increase in the current the consumer is entitled to the maximum discount of ten per cent., all the terminal springs 18 will be bunched together, thereby cutting out the entire resistance 17, and thereby increasing the current in the coils 19 19 sufficiently to provide the opposing torque required for the discount of ten per cent.

In my application, Serial No. 68,751, filed July 18, 1901, I have broadly claimed the supplemental-pressure coil 15, as here shown.

While I have herein shown and particularly described the preferred embodiment of my invention, I do not wish to limit myself to the precise construction and arrangement as herein shown and particularly described; but,

Having thus described my invention, I claim as new and desire to secure by Letters Patent—

1. The combination with a system of electrical distribution, of a meter for measuring the load thereon, a supplemental winding for changing the rate of operation of the measuring element of the meter per unit of load or energy, electromagnetic means in series in the circuit for including the winding in circuit, and means controlled by the electromagnetic means for varying the strength of the said auxiliary winding to decrease the torque upon an increase in current, substantially as described.

2. The combination with a system of electrical distribution, of a meter for measuring the load thereon, a supplemental winding for changing the rate of operation of the measuring element of the meter per unit of load or energy, means for changing the magnetizing effect due to the said auxiliary winding to modify the torque of the meter, and electromagnetic means in series in the circuit operating to decrease the magnetizing effect of the auxiliary winding upon an increase in current to decrease the torque, substantially as described.

3. The combination with a system of electrical distribution, of a commutated motor-meter for measuring the load thereon, a supplemental field-winding, a resistance divided into sections in circuit therewith, and an electromagnetic mechanism supplied with current from the system serving to include sections of the resistance in circuit with the auxiliary field-winding and to exclude the same from circuit with the said winding to thereby operate the measuring mechanism of the meter at a fluctuating rate per unit of load or energy by a fluctuating current to decrease the torque upon an increase in current, substantially as described.

4. The combination with a system of electrical distribution, of a commutated motor-meter for measuring the load thereon, a supplemental field-winding, a resistance divided into sections in series therewith, and an electromagnetic mechanism supplied with current from the system serving to include sections of the resistance in circuit with the auxiliary field-winding and to exclude the same from circuit with the said winding to thereby operate the measuring mechanism of the meter at a fluctuating rate per unit of load or energy by a fluctuating current to decrease the torque upon an increase in current, substantially as described.

5. The combination with a system of electrical distribution, of a commutated motor-meter for measuring the load thereon, a supplemental field-winding, a resistance divided into sections in circuit therewith, an electromagnetic mechanism supplied with current from the system serving to include sections of the resistance in circuit with the auxiliary field-winding and to exclude the same from circuit with the said winding to thereby operate the measuring mechanism of the meter at a fluctuating rate per unit of load or energy by a fluctuating current to decrease the torque upon an increase in current, and a circuit-closing switch for including the said auxiliary field-winding in circuit, substantially as described.

6. The combination with a system of electrical distribution, of a commutated motor-meter for measuring the load thereon, a supplemental field-winding, a resistance divided into sections in series therewith, an electromagnetic mechanism supplied with current from the system serving to include sections of the resistance in circuit with the auxiliary field-winding and to exclude the same from circuit with the said winding to thereby operate the measuring mechanism of the meter at a fluctuating rate per unit of load or energy by a fluctuating current to decrease the torque upon an increase in current, and a circuit-closing switch for including the said auxiliary field-winding in circuit, substantially as described.

7. The combination with a system of electrical distribution, of a meter for measuring the load thereon, a supplemental field-winding, a resistance divided into sections in circuit therewith, and an electromagnetic mechanism supplied with current from the system serving to include sections of the resistance in circuit with the auxiliary field-winding and to exclude the same from circuit with the said winding to thereby operate the measuring mechanism of the meter at a fluctuating rate per unit of load or energy by a fluctuating current to decrease the torque upon an increase in current, substantially as described, 8. The combination with a system of electrical distribution, of a meter for measuring the load thereon, a supplemental field-winding, a resistance divided into sections in series therewith, and an electromagnetic mechanism supplied with current from the system serving to include sections of the resistance in circuit with the auxiliary field-winding and to exclude the same from circuit with the said winding to thereby operate the measuring mechanism of the meter at a fluctuating rate per unit of load or energy by a fluctuating current to decrease the torque upon an increase in current, substantially as described.

9. In an electric meter, the combination with a supplemental winding for changing the rate of operation of the measuring element of the meter per unit of load or energy, of electromagnetic means for including the winding in circuit, and means controlled by the electromagnetic means for varying the strength of the said auxiliary winding to decrease the torque upon an increase in current, substantially as described.

10. In a commutated motor-meter, the combination with a supplemental field-winding, of a resistance divided into sections in series therewith, and an electromagnet supplied with current from the system serving to include sections of the resistance in circuit with the auxiliary field-winding and to exclude the same from circuit with the said winding to thereby operate the measuring mechanism of the meter at a fluctuating rate per unit of load or energy by a fluctuating current to decrease the torque upon an increase in current, substantially as described.

In witness whereof I hereunto subscribe my name this 23d day of May, A. D. 1901.

THOMAS DUNCAN.

Witnesses:
GEORGE L. CRAGG,
HERBERT F. OBERGFELL.